(12) United States Patent
Liu

(10) Patent No.: US 8,501,336 B2
(45) Date of Patent: Aug. 6, 2013

(54) BATTERY BOX AND ELECTRONIC DEVICE USING THE SAME

(75) Inventor: Bao-Shuai Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 605 days.

(21) Appl. No.: 12/730,216

(22) Filed: Mar. 23, 2010

(65) Prior Publication Data
US 2011/0020681 A1 Jan. 27, 2011

(30) Foreign Application Priority Data

Jul. 23, 2009 (TW) .............................. 98124845 A

(51) Int. Cl.
| | |
|---|---|
| *H01M 2/00* | (2006.01) |
| *H01M 2/02* | (2006.01) |
| *H01M 2/04* | (2006.01) |
| *H01M 2/10* | (2006.01) |

(52) U.S. Cl.
USPC ............... 429/97; 429/99; 429/100; 429/156; 429/175

(58) Field of Classification Search
USPC ............... 429/96–97, 99–100, 151–153, 156, 429/162–163, 175–177
See application file for complete search history.

(56) References Cited

U.S. PATENT DOCUMENTS

| | | | | |
|---|---|---|---|---|
| 1,900,906 | A | * | 3/1933 | Brown ......................... 362/197 |
| 4,416,595 | A | * | 11/1983 | Cromie ........................ 417/476 |
| 5,537,022 | A | * | 7/1996 | Huang ........................ 320/107 |
| 2006/0141344 | A1* | | 6/2006 | Chen et al. ..................... 429/97 |
| 2006/0172183 | A1* | | 8/2006 | Chen et al. ..................... 429/97 |
| 2007/0026297 | A1* | | 2/2007 | Qin et al. ....................... 429/97 |

* cited by examiner

Primary Examiner — Jonathan Crepeau
Assistant Examiner — Jacob Buchanan
(74) Attorney, Agent, or Firm — Altis Law Group, Inc.

(57) ABSTRACT

A battery box includes at least one battery and a switch apparatus. The switch apparatus includes a first conductor, a second conductor, and an operation element. The first conductor includes a first conductive portion and a first contact portion protruding from the first conductive portion. The second conductor includes a second conductive portion and a second contact portion protruding from the second conductive portion. The operation element is movable with respect to the housing and able to resist the second conductive portion along with the movement of the operation element. When the operation element is moved to resist the second conductive portion, the second contact portion contacts with the first contact portion, and when the operation element is moved to separate from the second conductive portion, the second contact portion does not contact with the first contact portion. An electronic device using the battery box is also provided.

8 Claims, 10 Drawing Sheets

BATTERY BOX AND ELECTRONIC DEVICE USING THE SAME

BACKGROUND

1. Technical Field

The present disclosure relates to battery boxes and electronic devices and, particularly, to an electronic device using a battery box.

2. Description of Related Art

When a battery is mounted in an electronic device, it is coupled to an electronic board of the electronic device to provide power to the electronic board, so that the electronic board and the electronic device can operate. However, even if the electronic device has been powered off, the battery still discharges via the electronic board, which is a waste of power and reduces the service life of the battery.

BRIEF DESCRIPTION OF THE DRAWINGS

The components of the drawings are not necessarily drawn to scale, the emphasis instead being placed upon clearly illustrating the principles of a battery box and an electronic device using the same. Moreover, in the drawings, like reference numerals designate corresponding parts throughout several views.

DETAILED DESCRIPTION

Figure 1:
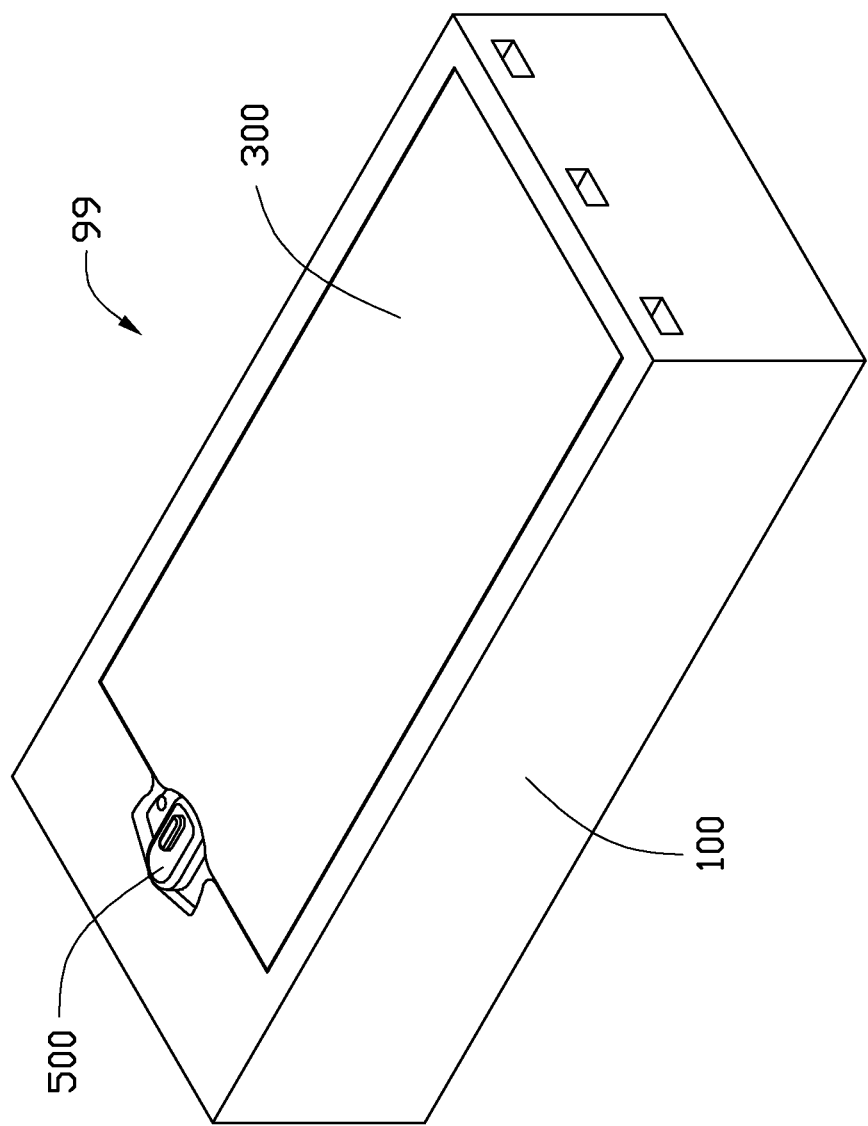
FIG. 1 is an isometric view of a battery box in accordance with an exemplary embodiment, showing the battery box in a first state.
Figure 2:
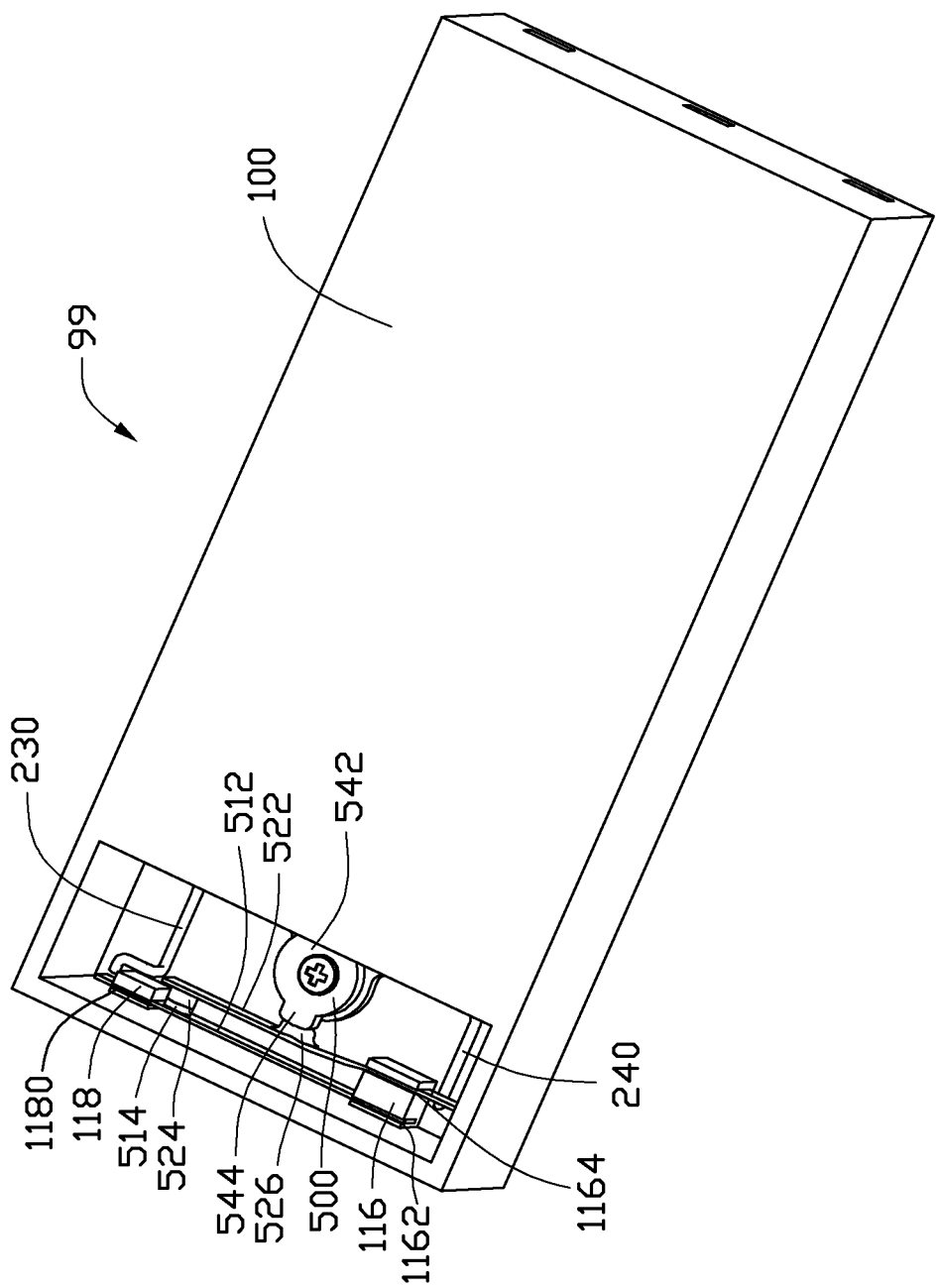
FIG. 2 is another isometric view of the battery box of FIG. 1, viewed from another perspective.
Figure 3:
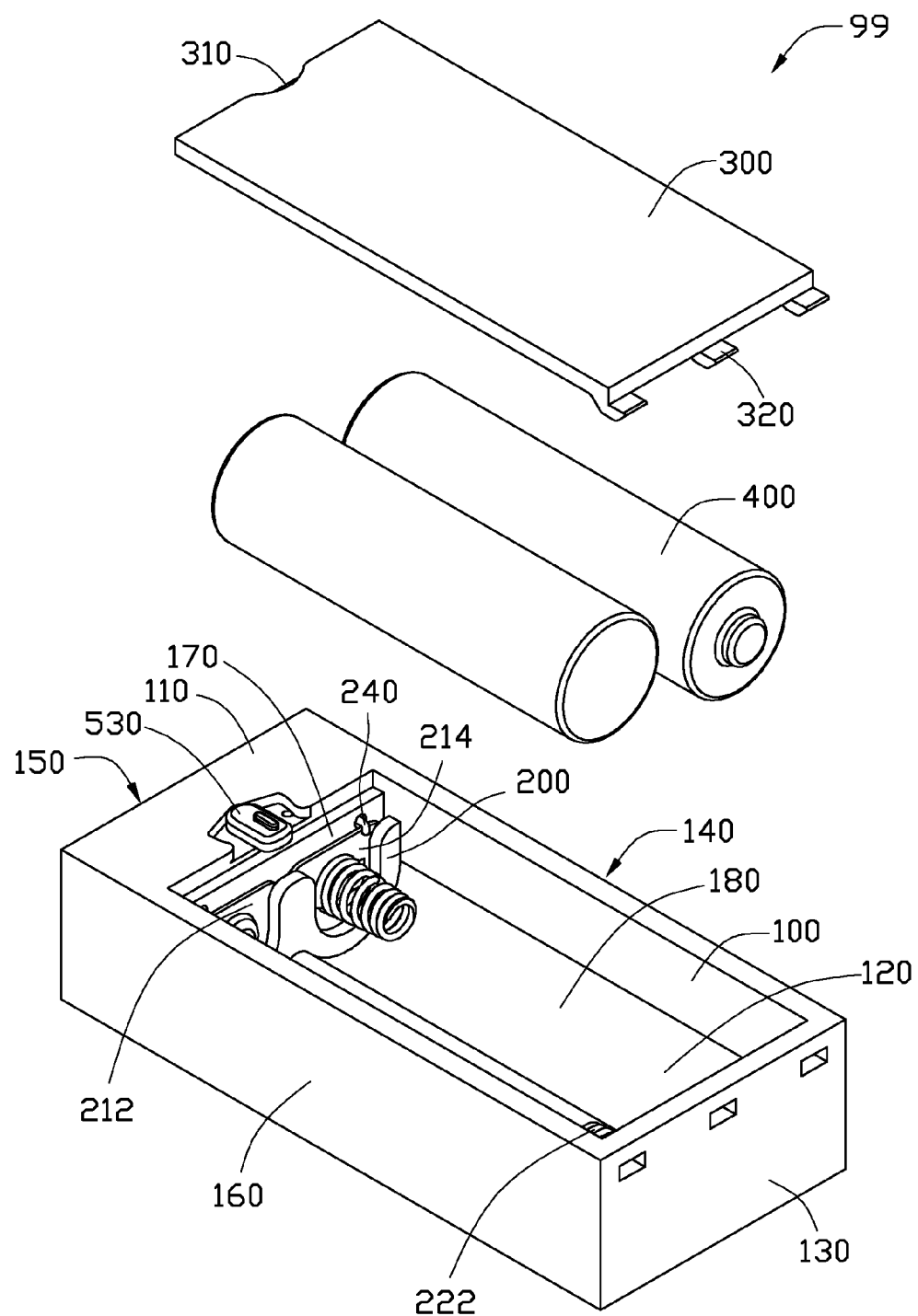
FIG. 3 is a partially exploded, perspective view of the battery box of FIG. 1.

Referring to FIGS. 1-3, a battery box 99 includes a housing 100 and a battery cover 300. The housing 100 cooperates with the battery cover 300 to form an interior space for receiving a pair of batteries 400. The battery box 99 further includes a switch apparatus 500 for controlling the discharge of the batteries 400.

Figure 4:
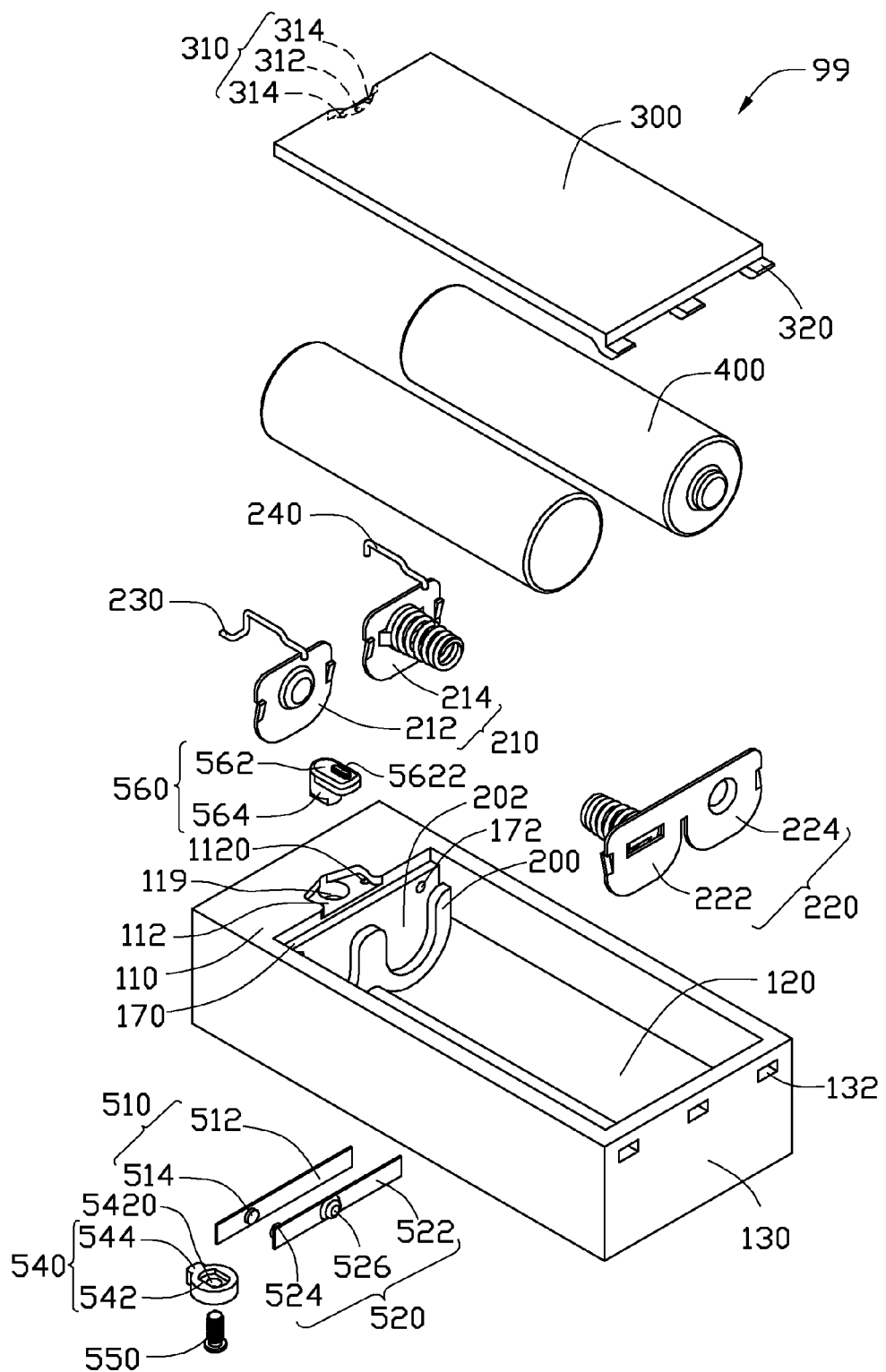
FIG. 4 is an exploded, perspective view of the battery box of FIG. 3.
Figure 5:
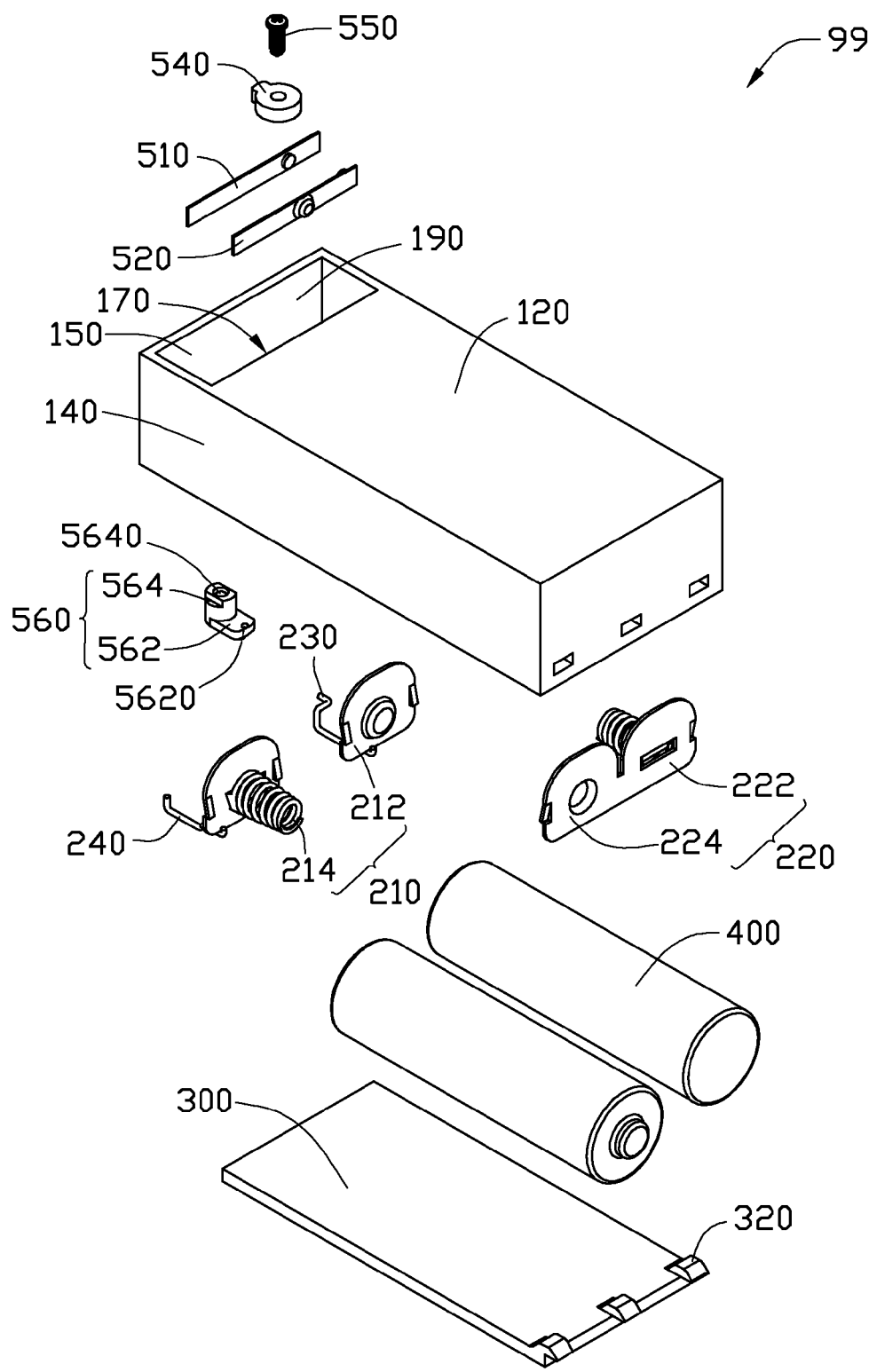
FIG. 5 is an exploded, perspective view of the battery box of FIG. 1, viewed from another perspective.
Figure 6:
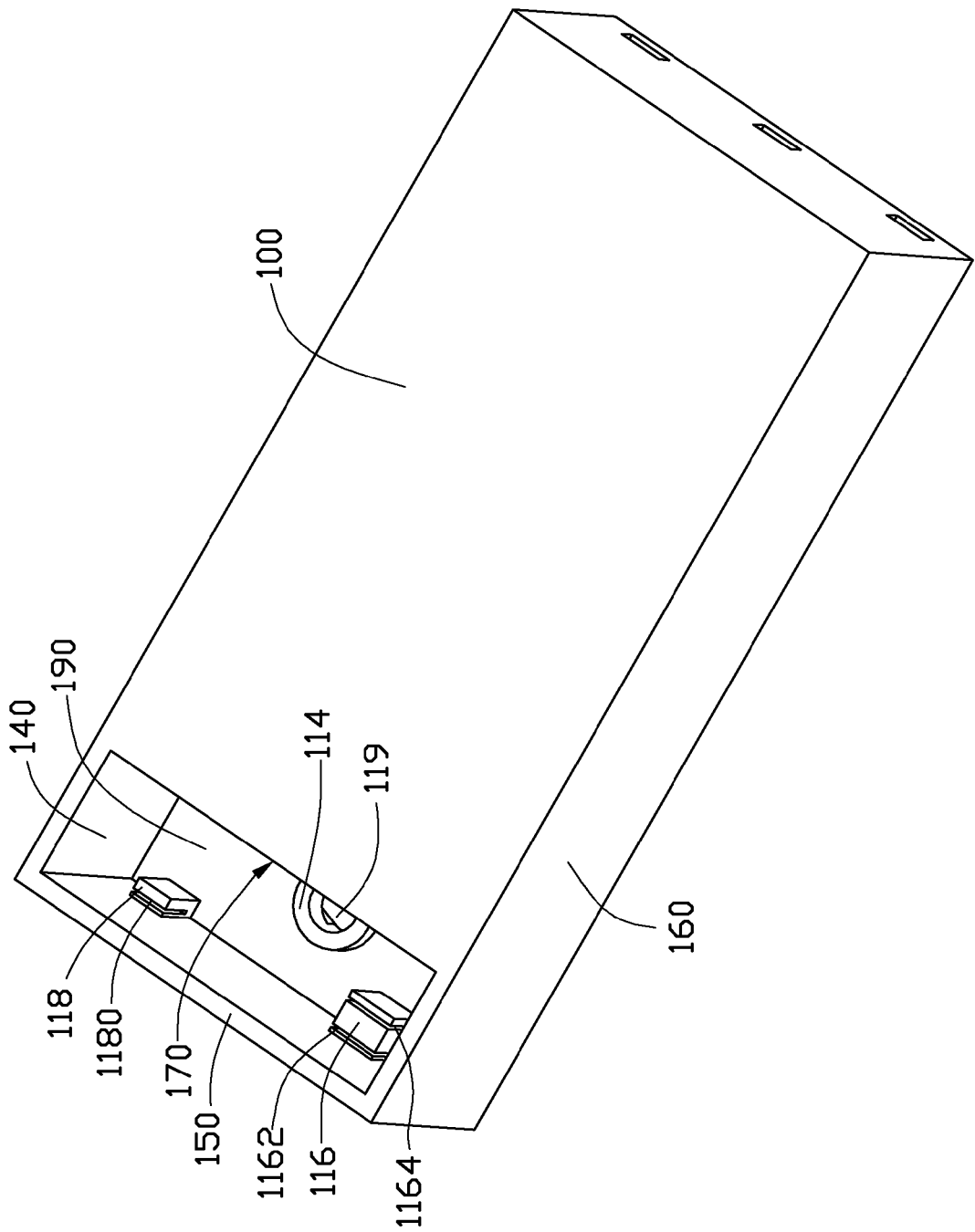
FIG. 6 is an isometric view of a housing of the battery box of FIG. 5, viewed from another perspective.

Referring also to FIGS. 4-6, the housing 100 is generally square cuboid. The housing 100 includes a top board 110, a bottom board 120, a first sideboard 130, a second sideboard 140, a third sideboard 150, and a fourth sideboard 160. The first sideboard 130 is perpendicularly secured to the second sideboard 140 and the fourth sideboard 160. The third sideboard 150 is also perpendicularly secured to the second sideboard 140 and the fourth sideboard 160. The first sideboard 130 is parallel with the third sideboard 150, and the second sideboard 140 is parallel with the fourth sideboard 160.

A fixing board 170 is mounted on the bottom board 120. The fixing board 170 connects the second sideboard 140 to the fourth sideboard 160. The fixing board 170, the first sideboard 130, the second sideboard 140, the fourth sideboard 160, and the bottom board 120 enclose a first receiving space 180. The first receiving space 180 is for receiving the batteries 400. The fixing board 170, the second sideboard 140, the third sideboard 150, the fourth sideboard 160, and the top board 110 enclose a second receiving space 190.

The top board 110 defines an aperture 112 facing the battery cover 300 and communicating with the first receiving space 180. A pair of fixing holes 1120 is defined in the bottom of the aperture 112. An arcuate retaining portion 114 adjacent to the fixing board 170 protrudes from the bottom of the second receiving space 190. A through hole 119 is defined in the retaining portion 114. The through hole 119 extends through the top board 110 and is disposed between the fixing holes 1120. A first latching portion 116 and a second latching portion 118 protrude from the bottom of the second receiving space 190. Both the first latching portion 116 and the second latching portion 118 are adjacent to the third sideboard 150. The retaining portion 114 is disposed between the first latching portion 116 and the second latching portion 118. The first latching portion 116 defines a first slot 1162 and a second slot 1164. The first slot 1162 and the second slot 1164 are parallel with the third sideboard 150, and the first slot 1162 is adjacent to the third sideboard 150. The second latching portion 118 defines a third slot 1180. The third slot 1180 is substantially coplanar with the first slot 1162, and the width of the third slot 1180 is generally equal to that of the first slot 1162.

The first sideboard 130 defines three latching holes 132 extending through the first sideboard 130. The latching holes 132 are substantially coplanar with each other, and far away from the bottom board 120. The fixing board 170 defines a pair of guide holes 172 extending through the fixing board 170. The guide holes 172 are far away from the bottom board 120.

The first receiving space 180 further receives a pair of fixing portions 200, a first conductive element 210, a second conductive element 220, a first lead 230, and a second lead 240.

The fixing portions 200 are mounted on the bottom of the first receiving space 180. One of the fixing portions 200 is adjacent to the fixing board 170, and the other fixing portion 200 is adjacent to the first sideboard 130. Each of the fixing portions 200 defines a pair of U-shaped opening 202 opposite to the bottom of the first receiving space 180.

The first conductive element 210 includes a first negative portion 212 and a first positive portion 214. The first conductive element 210 is disposed between the fixing board 170 and the fixing portion 200. The first negative portion 212 and the first positive portion 214 are exposed to the fixing portion 200 via the openings 202, respectively. The first lead 230 is electrically connected to the first negative portion 212, and the second lead 240 is electrically connected to the first positive portion 214. The first lead 230 and the second lead 240 can extend through the guide holes 172, respectively.

The second conductive element 220 includes a second positive portion 222 and a second negative portion 224. The second conductive element 220 is disposed between the first sideboard 130 and the fixing portion 200. The second positive portion 222 and the second negative portion 224 are exposed to the fixing portion 200 via the openings 202, respectively. The first negative portion 212 corresponds to the second positive portion 222, and the first positive portion 214 corresponds to the second negative portion 224.

One end of the battery cover 300 defines a recessed portion 310 opposite to the housing 100. The recessed portion 310 defines a first concave hole 312 and a pair of second concave holes 314. The diameter of the first concave hole 312 is generally equal to that of the second concave holes 314. The first concave hole 312 is disposed between the second concave holes 314. Three hook portions 320 extend from the other end of the battery cover 300. Each of the hook portions 320 corresponds to one of the latching holes 132. The hook portions 320 cooperate with the latching holes 132 to secure the battery cover 300 to the housing 100.

The switch apparatus 500 includes a first conductor 510, a second conductor 520, and an operation element 530.

The first conductor 510 includes a first conductive portion 512 and a first contact portion 514 protruding from one sidewall of the first conductive portion 512. The first conductive portion 512 is generally rectangular. The thickness of the first conductive portion 512 is generally equal to or little less than the width of the first slot 1162 and the third slot 1180. The length of the first conductive portion 512 is greater than the distance between the first latching portion 116 and the second latching portion 118.

The second conductor 520 includes a second conductive portion 522, a second contact portion 524 protruding from one sidewall of the second conductive portion 522, and a resisting projection 526 protruding from an opposite sidewall of the second conductive portion 522. The second conductive portion 522 is generally rectangular. The thickness of the second conductive portion 522 is generally equal to or less than that of the second slot 1164. The length of the second conductive portion 522 is greater than the distance between the first latching portion 116 and the second latching portion 118. The second conductive portion 522 can be deformed due to an external force.

The operation element 530 includes a knob 560, a transmission portion 540, and a fixing portion 550.

The knob 560 includes a pushing portion 562 and a connecting portion 564 perpendicularly secured to one end of the pushing portion 562. A positioning projection 5620 protrudes from the pushing portion 562 facing the housing 100. The shape of the positioning projection 5620 is adapted to the first concave hole 312 and the second concave holes 314. A rotating projection 5622 protrudes from the pushing portion 563 opposite to the positioning projection 5620. The rotating projection 5622 is configured for users to operate the knob 560. The connecting portion 564 defines a first shaft hole 5640 along the axis of the connecting portion 564.

The transmission portion 540 includes a cylindrical main body 542 and a pressing projection 544 protrudes from the sidewall of the main body 542. The main body 542 defines a second shaft hole 5420 corresponding to the first shaft hole 5640. The fixing portion 550 extends through the second shaft hole 5420 and the first shaft hole 5640 to secure the knob 560 to the transmission portion 540.

The following description is employed to illustrate the procedure of assembling the battery box 99. Two opposite ends of the first conductive portion 512 are put into the first slot 1162 and the third slot 1180, respectively. One end of the second conductive portion 522 is put into the second slot 1164 to cause the second contact portion 524 to be aligned with the first contact portion 514, and cause the resisting projection 526 to be aligned with the retaining portion 114. The first lead 230 and the second lead 240 are passed through the guide holes 172, respectively, to cause the second lead 240 to contact with the second conductive portion 522. The batteries 400 are put into the first receiving space 180 with the anode of one of the batteries 400 contacting with the first negative portion 212, the cathode of one of the batteries 400 contacting with the second positive portion 222, the anode of the other battery 400 contacting with the second negative portion 224, and the cathode of the other battery 400 contacting with the first positive portion 240. The hook portions 320 of the battery cover 300 are inserted into the latching holes 132, respectively, to cause the battery cover 300 to be secured to the housing 100. The transmission portion 540 is mounted on the retaining portion 114, and the pressing projection 544 resists the resisting projection 526 of the second conductor 520 to cause the second conductor 520 to be deformed, and cause the second contact portion 524 of the second conductor 520 to contact with the first contact portion 514 of the first conductor 510. The connecting portion 564 of the knob 560 is extended through the through hole 119 and the second shaft hole 5420 in sequence, and the positioning projection 5620 of the knob 560 is received in the first concave hole 312 of the battery cover 300. The fixing portion 550 extends through the second shaft hole 5420 and the first shaft hole 5640 in sequence to secure the knob 560 to the transmission portion 540.

When the positioning projection 5620 is received in the first concave hole 312, the pressing projection 544 of the transmission portion 500 resists the resisting projection 526 of the second conductor 520 to cause the second contact portion 524 to contact the first contact portion 514, and at this point the battery box 99 is in a first state. In the first state, if a lead (not shown) extending from the first conductor 510 is electrically connected to an anode of an external electronic element (not shown), and the second lead 230 is electrically connected to a cathode of the external electronic element, the batteries 400 can provide power to the external electronic element. Furthermore, in the first state, with the positioning projection 5620 of the knob 560 positioned in the first concave hole 312 of the battery cover 300, thus the battery cover 300 cannot be removed from the housing 100.

Figure 7:
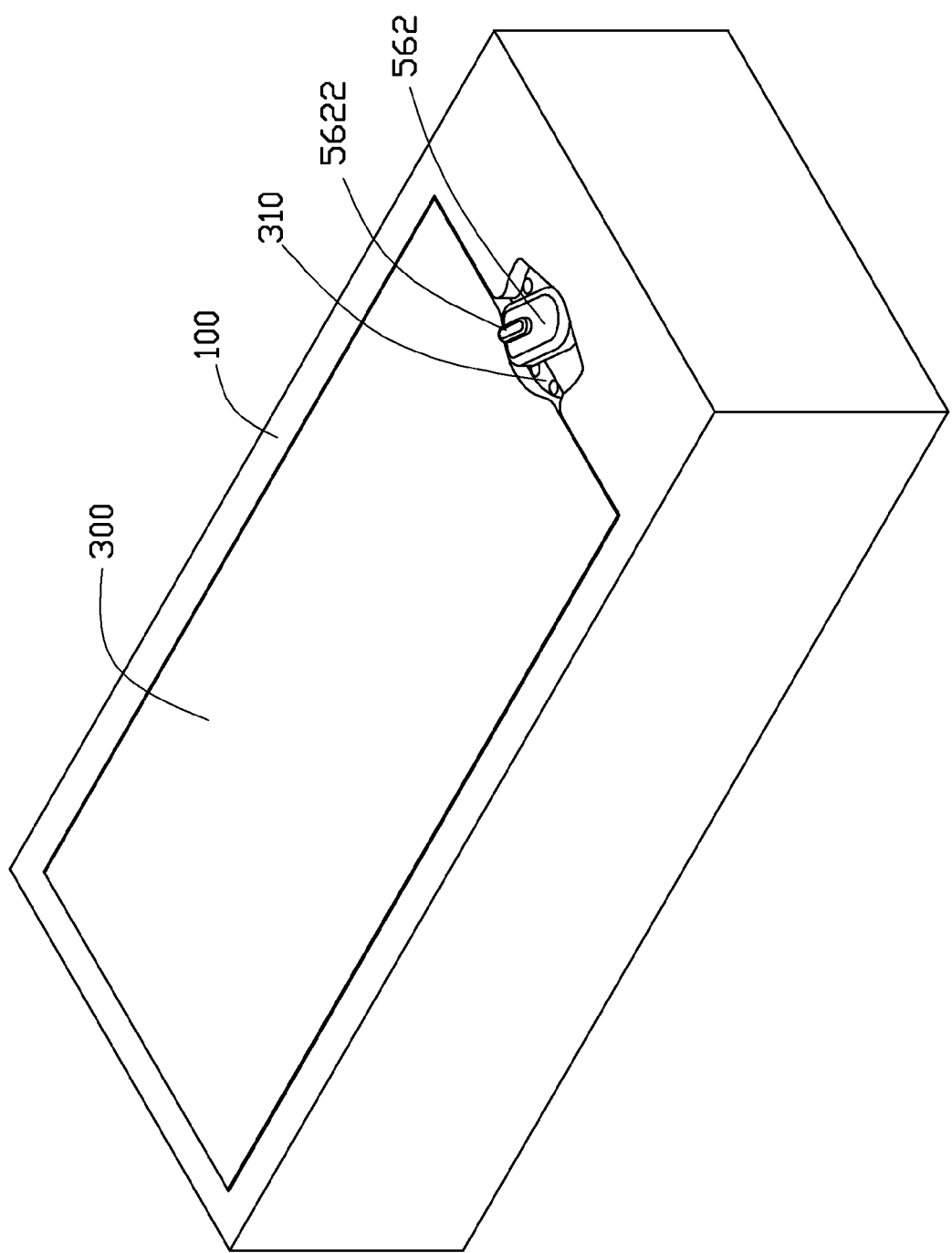
FIG. 7 is an isometric view of the battery box of FIG. 1, showing the battery box in a second state.
Figure 8:
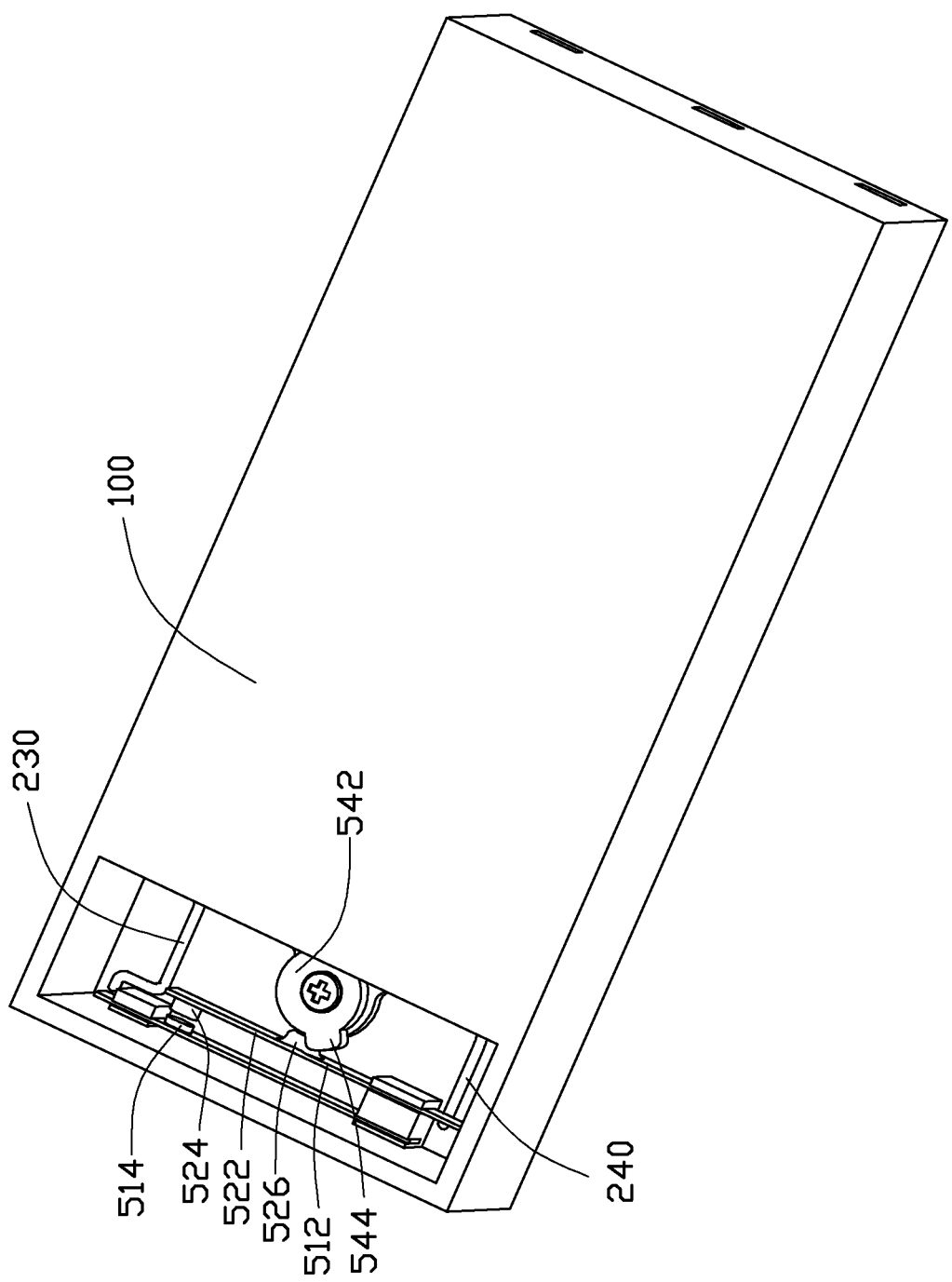
FIG. 8 is an isometric view of the battery box of FIG. 7, viewed from another perspective.

Referring also to FIGS. 7-8, if the rotating projection 5622 of the knob 560 is rotated right or left to cause the positioning projection 5620 to be removed from the first concave hole 312 and received in one of the second concave holes 314, the battery box 99 will then be in a second state. In the second state, the pressing projection 544 of the transmission portion 500 does not resist the resisting projection 526 of the second conductor 540, thus the second conductor 540 rebounds, and the second contact portion 524 does not contact with the first contact portion 514. That is, in the second state, the batteries 400 cannot provide power to the external electronic element. Furthermore, in the second state, as the positioning projection 5620 of the knob 560 is positioned in the second concave hole 314 of the battery cover 300, thus the battery cover 300 cannot be removed from the housing 100.

Figure 9:
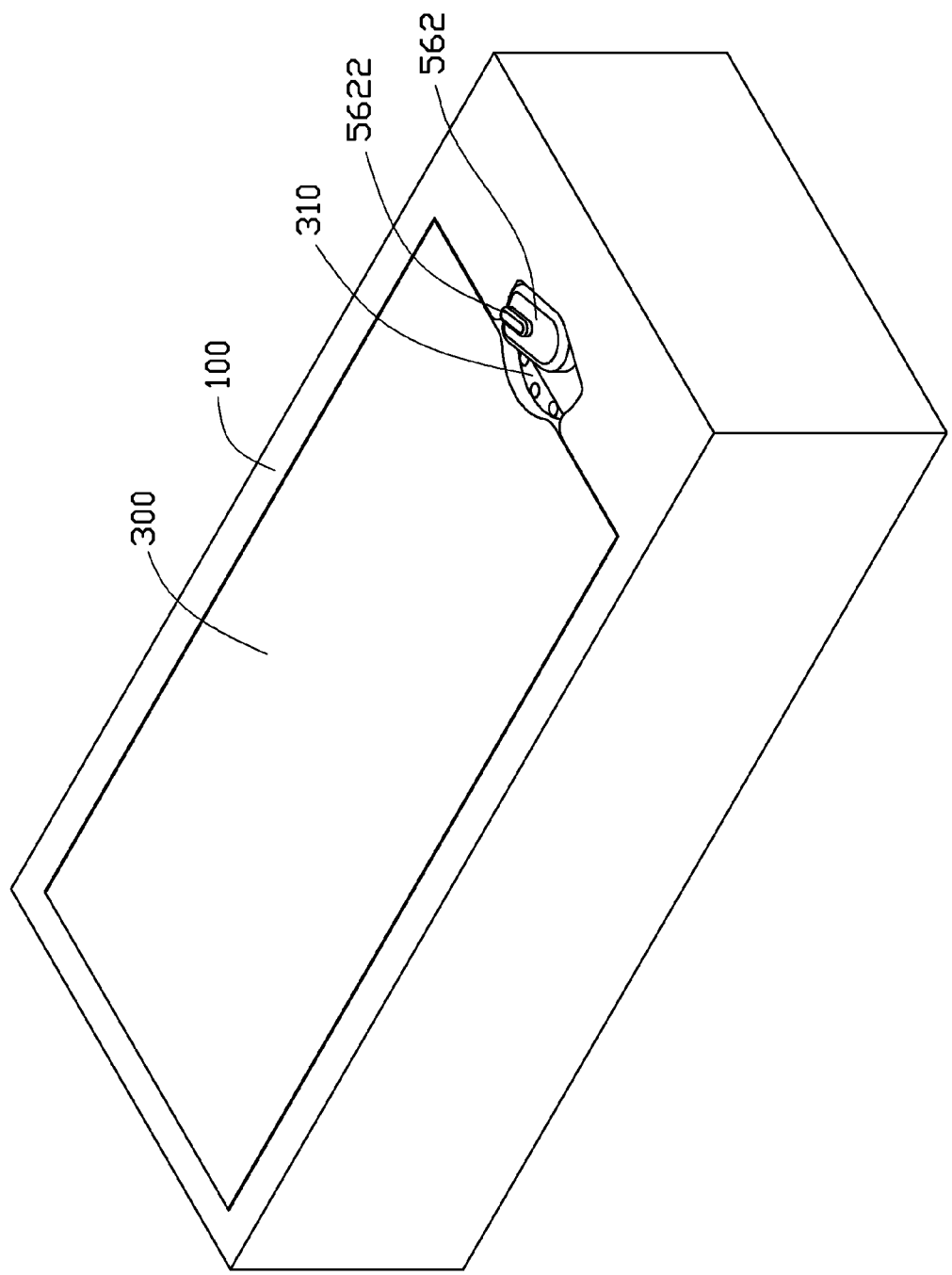
FIG. 9 is an isometric view of the battery box of FIG. 1, showing the battery box in a third state.

Referring also to FIG. 9, if the rotating projection 5622 of the knob 560 is rotated right or left to cause the positioning projection 5620 to be removed from the second concave hole 312 and received in the fixing hole 1120 of the housing 100, the battery box 99 will then be in a third state. In the third state, the pressing projection 544 of the transmission portion 500 does not resist the resisting projection 526 of the second conductor 540, and the second contact portion 524 does not contact with the first contact portion 514. That is, in the third state, the batteries 400 cannot provide power to the external electronic element. Furthermore, in the third state, as the positioning projection 5620 is positioned in the fixing hole 1120 of the housing 100, the battery cover 300 can be removed from the housing 100.

Figure 10:
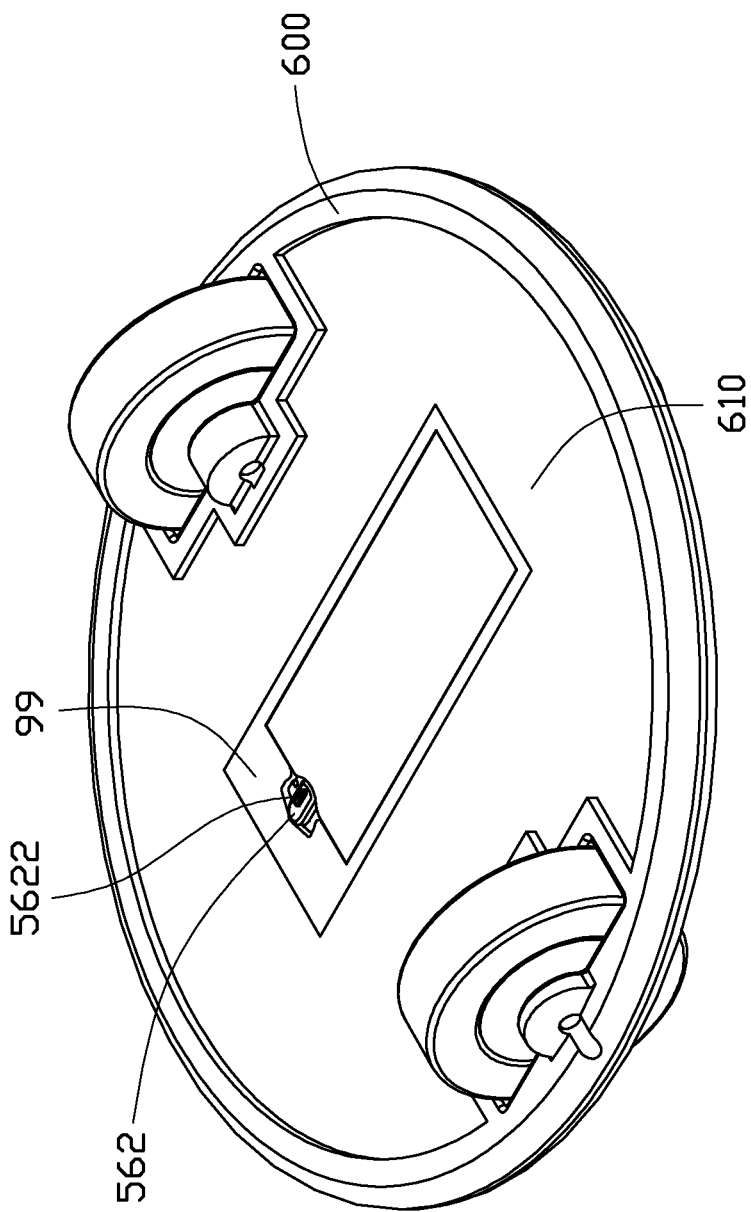
FIG. 10 is an isometric view of an electronic device in accordance with an exemplary embodiment, showing the battery box employed in the electronic device.

FIG. 10 shows the battery box 99 employed in an electronic device 600. In the embodiment, the electronic device 600 is an electronic toy. When the battery box 99 is mounted in a shell 610 of the electronic device 600, the pushing portion 562 of the switch apparatus 500 is exposed to the electronic device 600, thus users can push the rotating projection 5622 of the pushing portion 562 to control the battery box 99. As described above, if a lead extending from the first conductor 510 is electrically connected to an anode of an electronic element (not shown) of the electronic device 600, and the first lead 230 is electrically connected to a cathode of an electronic element, the battery box 99 can provide power to the electronic device 600.

With such configuration, when the electronic device 600 is powered off, users can operate the switch apparatus 500 of the battery box 99 to cause the battery box 99 to be in the second or third state. That is, users can operate the switch apparatus 500 to cut the electrical connection between the batteries 400 and the electronic device 600. Therefore, the batteries 400 do not discharge when the electronic device 600 is powered off, and the service life of the batteries 400 prolongs.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A battery box for mounting at least one battery therein, the at least one battery comprises a first polarity terminal and a second polarity terminal, the second polarity terminal of the at least one battery is electrically connected to a second polarity terminal of an external electronic device, the battery box comprising:
  a housing comprising a top surface and a bottom surface opposite to the top surface, the top surface defining a first receiving space to receive the at least one battery, the bottom surface defining a second receiving space; and
  a switch apparatus comprising:
  a first conductor received in the second receiving space, wherein the first conductor comprises a first conductive portion and a first contact portion protruding from the first conductive portion, the first conductive portion is electrically connected to a first polarity terminal of the external electronic device;
  a second conductor received in the second receiving space, wherein the second conductor comprises a second conductive portion and a second contact portion protruding from the second conductive portion, the second conductive portion is electrically connected to a first polarity terminal of the at least one battery, and the second contact portion aligns with the first contact portion; and
  an operation element movable with respect to the housing and able to resist the second conductive portion along with the movement of the operation element, wherein when the operation element is moved to resist the second conductive portion, the second contact portion contacts with the first contact portion, and when the operation element is moved to separate from the second conductive portion, the second contact portion does not contact with the first contact portion; and
  further comprising a battery cover, wherein the battery cover defines a first concave hole and at least one second concave hole, a positioning projection adapted to the first concave hole and the at least one second concave hole protrudes from the operation element, when the operation element is moved to cause the positioning projection to be received in the first concave hole, the first contact portion contacts with the second contact portion, and when the operation element is moved to cause the positioning projection to be received in one of the at least one second concave hole, the first contact portion does not contact with the second contact portion.

2. The battery box as described in claim 1, wherein the housing comprises a first latching portion and a second latching portion, the operation element is disposed between the first latching portion and the second latching portion, the first latching defines a first slot and a second slot parallel with the first slot, the second latching portion defines a third slot coplanar with the first slot, one end of the first conductive portion is received in the first slot, and the other end of the first conductive portion is received in the third slot, and one end of the second conductive portion is received in the second slot.

3. The battery box as described in claim 2, wherein the first latching portion and the second latching portion protrude from the bottom of the second receiving space.

4. The battery box as described in claim 1, wherein the operation element comprises a knob and a transmission portion secured to the knob, the transmission portion is moved along with the movement of the knob, a pressing projection protrudes from the transmission portion, when the transmission portion is moved to cause the pressing projection to resist the second conductive portion, the second contact portion contacts with the first contact portion, and when the transmission portion is moved to cause the pressing projection to be separated from the second conductive portion, the second contact portion does not contact with the first contact portion.

5. An electronic device comprises at least one battery mounted in the electronic device, the at least one battery comprises a first polarity terminal and a second polarity terminal, the second polarity terminal of the at least one battery is electrically connected to a second polarity terminal of an external electronic device, the electronic device comprising:
  a shell; and
  a battery box mounted in the shell and comprising:
  a housing comprising a top surface and a bottom surface opposite to the top surface, the top surface defining a first receiving space to mount the at least one battery, the bottom surface defining a second receiving space; and
  a switch apparatus comprising;
  a first conductor received in the second receiving space, wherein the first conductor comprises a first conductive portion and a first contact portion protruding from the first conductive portion, the first conductive portion is electrically connected to a first polarity terminal of the external electronic device;
  a second conductor received in the second receiving space, wherein the second conductor comprises a second conductive portion and a second contact portion protruding from the second conductive portion, the second conductive portion is electrically connected to a first polarity terminal of the at least one battery, and the second contact portion aligns with the first contact portion; and
  an operation element movable with respect to the housing and able to resist the second conductive portion along with the movement of the operation element, wherein when the operation element is moved to resist the second conductive portion, the second contact portion contacts with the first contact portion, and when the operation element is moved to separate from the second conductive portion, the second contact portion does not contact with the first contact portion; and
  further comprising a battery cover, wherein the battery cover defines a first concave hole and at least one second concave hole, a positioning projection adapted to the first concave hole and the at least one second concave hole protrudes from the operation element, when the operation element is moved to cause the positioning projection to be received in the first concave hole, the first contact portion contacts with the second contact portion, and when the operation element is moved to cause the positioning projection to be received in one of the at least one second concave hole, the first contact portion does not contact with the second contact portion.

6. The electronic device as described in claim 5, wherein the housing comprises a first latching portion and a second latching portion, the operation element is disposed between the first latching portion and the second latching portion, the first latching defines a first slot and a second slot parallel with the first slot, the second latching portion defines a third slot coplanar with the first slot, one end of the first conductive portion is received in the first slot, and the other end of the first conductive portion is received in the third slot, and one end of the second conductive portion is received in the second slot.

7. The electronic device as described in claim 6, wherein the first latching portion and the second latching portion protrude from the bottom of the second receiving space.

8. The electronic device as described in claim 5, wherein the operation element comprises a knob and a transmission portion secured to the knob, the transmission portion is moved along with the movement of the knob, a pressing projection protrudes from the transmission portion, when the transmission portion is moved to cause the pressing projection to resist the second conductive portion, the second contact portion contacts with the first contact portion, and when the transmission portion is moved to cause the pressing projection to be separated from the second conductive portion, the second contact portion does not contact with the first contact portion.

* * * * *